United States Patent [19]

Wood

[11] Patent Number: 4,688,422

[45] Date of Patent: Aug. 25, 1987

[54] DEVICE FOR QUICK CHANGEOVER BETWEEN WIND TUNNEL FORCE AND PRESSURE TESTING

[75] Inventor: Richard M. Wood, Virginia Beach, Va.

[73] Assignee: The United States of America as represented by the Administrator of the National Aeronautics and Space Administration, Washington, D.C.

[21] Appl. No.: 901,113

[22] Filed: Aug. 28, 1986

[51] Int. Cl.⁴ .......................................... G01M 19/00
[52] U.S. Cl. ..................................... 73/147; 73/756; 285/137.1; 285/901
[58] Field of Search ............... 73/756, 147; 285/137.1, 285/901

[56] References Cited

U.S. PATENT DOCUMENTS

| | | | |
|---|---|---|---|
| 2,523,481 | 9/1950 | Rabenhorst | 73/147 |
| 4,111,058 | 9/1978 | Gross | 73/147 |
| 4,653,317 | 3/1987 | Schte | 73/756 |

FOREIGN PATENT DOCUMENTS 0737530  8/1961  U.S.S.R. ................. 73/147

OTHER PUBLICATIONS

"A Construction Technique for Wind-Tunnel Models", NASA Tech. Briefs, Fall, 1980.

Primary Examiner—Donald O. Woodiel
Attorney, Agent, or Firm—George F. Helfrich; John R. Manning

[57] ABSTRACT

This invention is a device which allows for expeditious and repeated changeovers between pressure and force testing and which uses minimum internal volume of a wind tunnel test structure (24). A matrix configuration of holes (30) is located on the outer surface of the structure (24). Pressure tubes (27) lead through the internal cavity of the structure (24) from test sites (29) to this outer surface matrix configuration (30). A pressure tube connector (12) with a corresponding matrix of holes (17) is connected to the surface of the structure (24). Pressure tubes (11) leading from remotely located transducers (not shown) are joined to the connector (12), thus forming pressure passageways from the test sites (29) to the transducers (not shown) to allow for pressure testing. When force testing is required, the pressure tube connector (12) is disconnected and a cover plate (20) is connected. The cover plate (20) seals the exposed internal pressure tubes (27). Also, the outer surface (23) of the cover plate (20) conforms to the exterior of the structure (24), providing the necessary smooth surface for force testing. If further pressure testing is required, the cover plate (20) can be disconnected and the pressure tube connector (12) reconnected.

3 Claims, 3 Drawing Figures

DEVICE FOR QUICK CHANGEOVER BETWEEN WIND TUNNEL FORCE AND PRESSURE TESTING

ORIGIN OF THE INVENTION

The invention described herein was made by an employee of the U.S. Government and may be manufactured and used by or for the Government for governmental purposes without the payment of any royalties thereon or therefor.

BACKGROUND OF THE INVENTION

This invention relates to wind tunnel measuring and testing and more particularly to a device for quick changeover between force and pressure testing of a structure in a wind tunnel.

In the field of wind tunnel testing, pressure testing is accomplished by routing pressure via pressure tubing through orifices located on the model surface to transducers and measurement devices. Since most models have limited internal space, the transducers and measurement devices are often remotely located, requiring an extension of the pressure tubing from the model surface to the remote location. After pressure testing is complete, force testing is performed. Since force testing requires a smooth external model surface, a method of removing the pressure tubing at the model surface is necessary. Prior methods involve either individually disconnecting each pressure tube at the model surface or severing the pressure tubing flush with the model surface. Both methods involve a significant changeover time between force and pressure testing. Individually disconnecting numerous pressure tubes is time consuming and is of questionable utility, since the prior art discloses that the connecting bores between the pressure tube and model extend from the surface, creating an irregular surface after disconnection. Severing the tubing necessitates a time consuming reattachment of the tubing to the model surface when further pressure testing is required. Also, both methods require the placing of putty on the exposed internal pressure tubing to provide a smooth surface for force testing and the subsequent removal of the putty when further pressure testing is required.

Accordingly. it is an object of this invention to provide a means of changing over from wind tunnel pressure testing to force testing and vice versa which is expeditious and provides a smooth surface for force testing.

A further object of this invention is to provide a means for wind tunnel pressure testing requiring minimum internal volume of the model.

A further object of this invention is to provide a means of change-over between wind tunnel force and pressure testing which can be used repeatedly with no loss in efficiency.

Other objects and advantages of this invention will become apparent hereinafter in the specification and drawing which follow.

SUMMARY OF THE INVENTION

According to the present invention, the foregoing and additional objects are attained by providing any area of the model (wings, body, base area, etc.) with an outer surface matrix configuration of holes and a corresponding connector and cover plate. Pressure tubes are led through the internal cavity of the model from test orifices on the model's surface to a central location in close proximity to the model's surface. There these internal pressure tubes are organized and fixed into a matrix by the outer surface matrix configuration, which comprises a number of holes in the model's surface equal to the number of internal pressure tubes. A pressure tube connector comprising a surface with a matrix configuration of holes corresponding to the outer surface matrix configuration is connected to the outer surface matrix configuration. External pressure tubes lead from this pressure tube connector to remotely located transducers and measurement devices. As a result, multiple continuous pressure passageways are formed from the test orifices to the remotely located transducers and measurement devices, thereby requiring a minimum internal volume of the model to conduct pressure testing. Also, the pressure tube connector allows for a quick disconnection when force testing is required.

After disconnection of the pressure tube connector, a cover plate is connected to the outer surface matrix configuration. This cover plate has an inner surface which seals the outer surface matrix configuration. This cover plate also has an outer surface which conforms to the exterior of the model, thus providing the necessary smooth surface for force testing. If further pressure testing is required, the cover plate can be disconnected and the pressure tube connector reconnected.

DETAILED DESCRIPTION OF THE INVENTION

Figure 1:
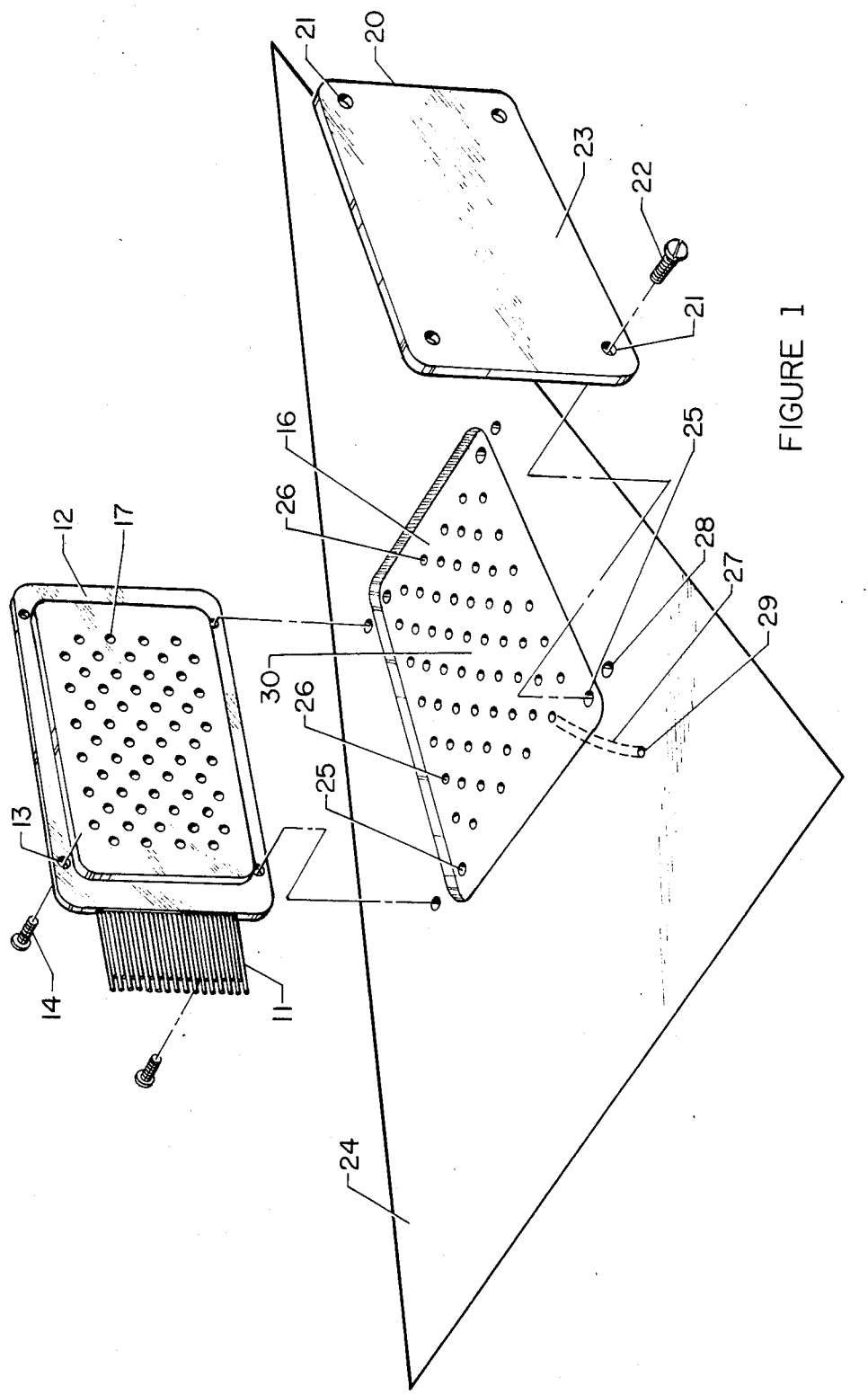
FIG. 1 is a pictorial view of a surface of a structure in a wind tunnel utilizing the present invention for a quick changeover between wind tunnel force and pressure testing.
Figure 2:
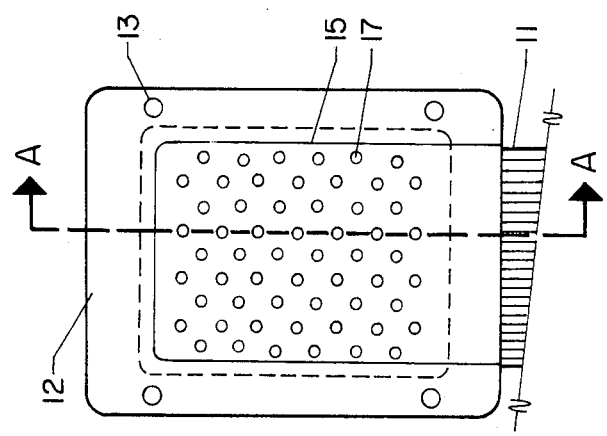
FIG. 2 is a bottom view of the pressure tube connector of FIG. 1 showing the matrix configuration of holes arranging the external pressure tubes.
Figure 2A:
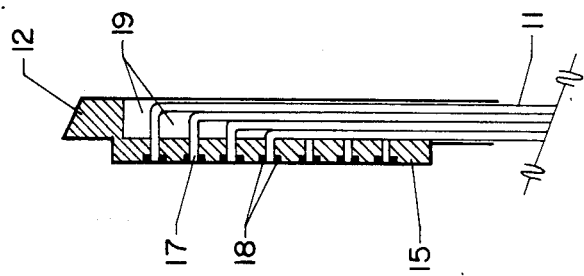
FIG. 2A is an exposed side view A—A of the pressure tube connector of FIG. 2 showing sealing O-rings and exit passageway.

As illustrated in FIG. 1, structure 24, here embodied as a wing, has a recessed receiving area 16 with n holes 26 (where n is an integer >1) arranged to form outer surface matrix configuration 30. Each hole 26 has affixed thereto an internal pressure tube 27 leading through the internal cavity of structure 24 to a test orifice 29 (only one internal pressure tube 27 and test orifice 29 are shown). Pressure tube connector 12 is connected to the surface of structure 24 by an appropriate number of connecting devices 14, here embodied as four screws, which pass through a corresponding number of attachment holes 13 located on pressure tube connector 12 and which are secured in a corresponding number of receiving holes 28, here threaded, surrounding recessed receiving area 16. Referring now to FIG. 2, pressure tube connector 12 has a raised area 15 with n holes 17 arranged in a matrix configuration corresponding to outer surface matrix configuration 30. Referring now to FIG. 2A, each hole 17 organizes and has affixed thereto a external pressure tube 11. A corresponding number of O-rings 18 seals the joint between each hole 17 and each external pressure tube 11. These flexible external pressure tubes 11 are orientated 90° by exit passageway 19 and led to remotely located transducers and measurement devices (not shown). Referring now to FIGS. 1 and 2A, upon connection of pressure tube connector 12 to the surface of structure 24, raised area 15 is fitted snugly into recessed receiving area 16, thus forming n continuous pressure passageways leading from n test orifices 29 to remotely located transducers and measurement devices and thereby allowing pressure testing to be performed utilizing minimum internal volume of structure 24. Significantly, a quick disconnection of n external pressure tubes 11 at the surface of recessed receiving area 16 for force testing is achieved by disconnecting connecting devices 14 from the surface of structure 24.

Once this disconnection is performed, cover plate 20 is connected to recessed receiving area 16 by an appropriate number of connecting devices 22, here four flat headed screws (flat headed to provide a smooth surface once the screws are secured), which pass through attachment holes 21 located on cover plate 20 and which are secured at receiving holes 25, here threaded, located within recessed receiving area 16. Cover plate 20 thereby fits snugly into recessed receiving area 16. Cover plate 20 also has an outer surface 23 which conforms to the external contour of structure 24. Thus, cover plate 20 seals the n internal pressure tubes 27 and provides the smooth surface necessary for force testing. If further pressure testing is required, cover plate 20 is disconnected by disconnecting connecting devices 22 and connector 12 is reconnected as described above.

It should become apparent to those skilled in the art that the upper limit of n is determined by the number of test points desired and the amount of surface area of structure 24 available for this invention. The number n chosen should be as high as possible to achieve maximum efficiency in changeover time between force and pressure testing.

What is claimed as new and desired to be secured by Letters Patent of the United States is:

1. A device for quick changeover between force and pressure testing of a structure in a wind tunnel comprising:
    a number n of internal pressure tubes (where n is a integer more than one) located within the structure and leading from desired n test points on a surface of the structure to a central location within the structure and in close proximity to any surface thereof:
    an outer surface matrix configuration located on the surface of the structure and in close proximity to the central location including n holes to which said n internal pressure tubes are fixed;
    a connector including n holes forming a matrix configuration which corresponds to said outer surface matrix configuration;
    n external pressure tubes fixed to corresponding n holes of said connector and leading to corresponding, remotely situated transducers;
    a means for connecting said connector and said outer surface matrix configuration to form n continuous pressure tubes leading from the desired test points to the corresponding, remotely situated transducers;
    a means for disconnecting said connector from said outer surface matrix configuration;
    a cover plate including an outer surface which conforms to the outer surface of the structure;
    a means for connecting said cover plate and said outer surface matrix configuration to form a seal for said n internal pressure tubes and a smooth, continuous outer surface of the structure for force testing; and
    a means for disconnecting said cover plate from said outer surface matrix configuration.

2. The device of claim 1 wherein the means for connecting said cover plate and said outer surface matrix configuration comprises flat headed screws to provide a smooth surface for force testing after being secured.

3. The device of claim 1 wherein n O-rings are used to seal the joints between said n external pressure tubes and corresponding n holes of said connector.

* * * * *